3,265,675
VINYL 2,2-DIMETHYLALKYL ETHERS AND
POLYMERS THEREOF
Hugh J. Hagemeyer, Jr., Alden E. Blood, and James D. Heller, Longview, Tex., assignors to Eastman Kodak Company, Rochester, N.Y., a corporation of New Jersey
No Drawing. Filed Apr. 2, 1962, Ser. No. 184,493
7 Claims. (Cl. 260—85.5)

This invention relates to vinyl 2,2-dimethylalkyl ethers, to polymers thereof, and to the preparation of these materials.

The new class of monomeric compounds of the invention are represented by the following general formula:

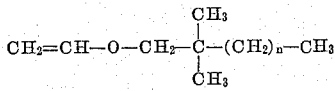

wherein $n$ represents a whole number 1, 2, 3, etc., and preferably 1 to 14, for example, vinyl 2,2-dimethylbutyl ether, vinyl 2,2-dimethylpentyl ether, vinyl 2,2-dimethylhexyl ether, vinyl 2,2-dimethylheptyl ether, vinyl 2,2-dimethyloctyl ether, vinyl 2,2-dimethyldecyl ether, vinyl 2,2-dimethyldodecyl ether, vinyl 2,2-dimethyltetradecyl ether, etc. The above defined monomeric compounds are liquids under normal conditions. They are particularly useful for the preparation of high molecular weight homopolymers and copolymers which vary from tough, strong, flexible materials of high clarity to viscous sticky materials depending on the number of carbons in the 2,2-dimethylalkyl group and on the degree of crystallinity. In general, as the carbon content increases, the polymers become softer and more viscous and sticky. All of these resinous polymers have exceptional thermal and hydrolytic stability as compared with vinyl alkyl ethers devoid of the 2,2-dimethylalkyl group structure. Some of these polymers of moderate or low crystallinity are excellent adhesives and index viscosity improvers, while others of higher crystallinity, for example, crystalline poly(vinyl 2,2-dimethylbutyl ether), are high melting and useful for the preparation of clear, strong film and sheeting having an extended temperature range of useful flexibility as compared with previously known polyvinyl ethers. The resinous copolymers of the invention prepared from the above defined vinyl 2,2-dimethylalkyl ethers and one or more other polymerizable monomers, and more particularly with acrylonitrile, vinyl chloride, alkyl acrylates and methacrylates wherein the alkyl groups contain from 1 to 4 carbon atoms such as the methyl, ethyl, propyl, isopropyl, butyl, sec. butyl, etc., acrylates and methacrylates, and the like, have exceptionally advantageous properties for making shaped articles and are preferred. Both the monomers and polymers are compatible with other polymeric products such as polypropylene, polyethylene, polyvinyl chloride and impart low temperature flexibility thereto when copolymerized, graft copolymerized or physically mixed therewith.

It is, accordingly, an object of the invention to provide novel monomeric vinyl 2,2-dimethylalkyl ethers as defined. Another object is to provide highly stable, resinous homopolymers and copolymers from these monomers ranging from viscous, sticky materials to tough high softening point solids having utility as adhesives, viscosity improvers, films, fibers and molded articles. Another object is to provide a process for preparing the new compounds. Other objects will become apparent hereinafter.

In accordance with the invention, we prepare the new monomeric vinyl 2,2-dimethylalkyl ethers by vinylation using potassium hydroxide as catalyst, for example, a mixture of potassium hydroxide and the appropriate intermediate 2,2-dimethylalkanol is charged to an autoclave and acetylene is then passed through the mixture at about from 150 to 300 p.s.i., at from 175 to 250° C., with agitation, for a period of six hours or more, and the vinyl 2,2-dimethylalkyl ether product is then separated by azeotropic distillation and the resulting distillate then fractionated. Suitable intermediate 2,2-dimethylalkanols are represented by the structural formula:

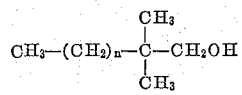

wherein $n$ is as previously defined. Typical alkanols of this kind include 2,2-dimethylbutanol, 2,2-dimethylhexanol, 2,2-dimethyloctanol, 2,2-dimethyldecanol, 2,2-dimethyldodecanol, 2,2-dimethyltetradeconal, etc. These alkanols may be prepared by hydrogenation of the corresponding 2,2-dimethylalkanoates by contact with a suitable catalyst such as barium copper chromite at about 250° C. and a pressure of from about 3,000 to 6,000 p.s.i. For further details of this process, reference may be had to copending application of Alden E. Blood and Hugh J. Hagemeyer, Jr., Serial No. 144,634, filed October 12, 1961, wherein is described the preparation of the above mentioned 2,2-dimethylalkanols.

To prepare the resinous polymers of the invention, the polymerizations of the new vinyl 2,2-dimethylalkyl ethers alone to form the corresponding resinous homopolymers or conjointly with each other or with one or more other monoethylenically unsaturated, polymerizable compounds containing a —CH=C< groups, and more especially a $CH_2$=C< group, can be carried out in bulk (mass), solution or emulsion processes, and advantageously in the presence of a polymerization catalyst. The resinous polymers obtained are then isolated from their reaction mixtures by conventional means as by precipitation, coagulation, evaporation of solvents, etc., and then washed and dried. Heat or actinic light can also be used to accelerate the polymerization reactions. For the solution polymerizations any inert organic solvent can be used, but preferably a hydrocarbon such as liquid propane, heptane, etc., while for the emulsion polymerizations nonsolvents such as methanol, acetone, etc., but preferably water or aqueous mixtures these nonsolvents are used with advantage. A variety of catalyst systems have been found efficacious. Thus in the copolymerizations when the vinyl ether of the invention is the major component (greater than 50 percent by weight), it is generally advantageous to use cationic systems. In some cases, however, free radical catalysts used in conjunction with ultraviolet light can be used to polymerize mixtures containing large amounts of the vinyl ethers. When the vinyl ether component is in moderate to low concentrations (less than 50 percent and as low as 1 percent by weight), any of the conventional free radical catalyst systems can be used. The catalyst system determines the amount of crystalline polymer produced. Free radical catalysts give polymers having low crystallinity, boron trifluoride catalysts give polymers having low to moderate crystallinity, and Ziegler and modified Ziegler type catalysts, such as described by H. M. Anderson, U.S. 3,009,908, dated November 21, 1961, give polymers having moderate to high crystallinity. However, in all the catalyst systems the vinyl 2,2-dimethylalkyl ethers of the invention give polymers of higher crystallinity than is obtained with the heretofore known vinyl ethers. Suitable conventional type catalysts include the peroxides, e.g., benzoyl peroxide, acetyl peroxide, tertiary butyl hydroperoxide, hydrogen peroxide, etc., persulfates, e.g., sodium, potassium and ammonium persulfates, persulfuric acid, etc., alkali metal perborates or percarbonates, water-soluble salts of perphosphoric acid, etc. Other catalysts such as boron trifluoride etherate, azo-bis isobutyronitrile, ketazines, azines, etc., can be used. The amount of catalyst or mixtures of two or more catalysts that can be employed may vary from about 0.1 to 3 percent, based on the weight of monomer to be polymerized. The temperature can vary over a wide range depending on the type of catalyst system used, but generally an overall temperature range of from about −80° C. to 100° C. gives good results. The polymerization may be operated batchwise or in a continuous or semi-continuous manner as desired. While atmospheric pressures are preferred, it is also within the purview of the invention to employ pressures above or below atmospheric.

For the emulsion polymerizations any nonsolvent for the monomer can be employed, water being especially advantageous. The monomer or mixture of monomers can be advantageously emulsified in water using an emulsifying agent such as a salt of a higher fatty acid, e.g., sodium or potassium laurate, stearate, palmitate, etc., an ordinary soap, a salt of a higher fatty alcohol sulfate, e.g., sodium or potassium lauryl sulfate, sodium or potassium di(3-ethylhexyl)sulphosuccinate, sodium or potassium cetyl sulfate, sodium or potassium stearyl sulfate, etc., a salt of an aromatic sulfonic acid, e.g., sodium or potassium salt of an alkylnaphthalene sulfonic acid, and the like. The amount of emulsifying agent employed can vary from about 1 to 5 percent based on the total weight of the reaction mixture. Also mixtures of the emulsifying agents can be used. For bead or granular polymerizations, relatively poor dispersing agents such as starch, methylated starch, gum arabic, polyvinyl alcohol, partially hydrolzed polyvinyl acetate, gelatin, sodium glycolate, etc., can be employed. The emulsions and dispersions may be facilitated by stirring, shaking or tumbling during the polymerization reaction. Advantageously, an activating agent such as sodium bisulfite, potassium bisulfite, sodium hydrosulfite, sulfonic acid, etc., can be used in conjunction with the peroxide catalyst and in about the same amount. If desired, a chain regulator such as mercaptan, e.g., hexyl, cetyl, lauryl mercaptans, etc., can also be used with advantage in the aqueous polymerization reaction mixture.

The resinous copolymers of the invention prepared by the above-described polymerization procedures may contain any proportions of one or more of the monomeric vinyl 2,2-dimethylalkyl ethers of the invention with any proportions of one or more of the mentioned other polymerizable monomers, but preferably in the proportions of from 1 to 99 percent by weight of the former to from 99 to 1 percent by weight of the latter monomers. The proportions of from 5 to 95 percent by weight of the ethers of the invention to from 95 to 5 percent by weight of the other mentioned polymerizable monomers have been found to give particularly useful resinous copolymers. The copolymers obtained generally contain about the same proportion of the constituents as were present in the starting polymerization mixtures.

The following examples will serve further to illustrate the novel monomers of the invention, polymers thereof, and the manner of preparing the same.

EXAMPLE 1.—SYNTHESIS OF VINYL 2,2-DIMETHYLALKYL ETHERS

The vinyl 2,2-dimethylalkyl ethers are prepared by vinylation using potassium hydroxide as catalyst. From 6 to 7 weight percent potassium hydroxide and the 2,2-dimethylalkanol is charged to an autoclave. The reaction was carried out at 200 p.s.i. acetylene pressure and 200° C. for six hours with agitation. After discharging from the autoclave, the organic material was water azeotroped from the caustic, hydroquinone added to the distillate and the material fractionated on a 100-plate column. When the top temperature indicated vinyl ether, the pressure was reduced and the distillation continued to remove crude vinyl ether. The crude vinyl ether was separated from alcohol by redistilling at reduced pressure followed by still another distillation at atmospheric pressure. The crude vinyl ether is an azeotrope with 2,2-dimethylalkanol which contains ca. 8 percent alcohol and boils approximately 1.5 degrees below the boiling point of the pure ether. The distillation at two different pressures serves to break the azeotropic system.

The properties of six of the vinyl 2,2-dimethylalkyl ether series prepared as above are given in the following table.

Table 1

PROPERTIES OF VINYL 2,2-DIMETHYLALKYL ETHERS

| Ether | Boiling Point (° C.) | Sp. Gr. (20° C./20° C.) | $N^D$ 25 |
|---|---|---|---|
| Vinyl 2,2-dimethylbutyl | 124.5 | 0.7944 | 1.4125 |
| Vinyl 2,2-dimethylhexyl | 167.5 | 0.8045 | 1.4232 |
| Vinyl 2,2-dimethyloctyl | 51/1.1 mm | 0.8116 | 1.4303 |
| Vinyl 2,2-dimethyldecyl | 93/2 mm | 0.8190 | 1.4373 |
| Vinyl 2,2-dimethyldodecyl | 127/1.8 mm | 0.8261 | 1.4445 |
| Vinyl 2,2-dimethyltetradecyl | 154/1.0 mm | 0.8334 | 1.4515 |

EXAMPLE 2.—BORON TRIFLUORIDE POLYMERIZED VINYL 2,2-DIMETHYLBUTYL ETHER

About 200 ml. of propane was condensed and cooled to −78° C. in a 500-ml., 3-necked flask equipped with an airdriven stirrer, separatory funnel, Dry Ice-acetone trap condenser, dry nitrogen blanket, and Dry Ice-acetone bath. Added 0.3 ml. of distilled boron trifluoride etherate to the rapidly stirred solution and then 12 grams of vinyl 2,2-dimethylbutyl ether (distilled over sodium) slowly over a period of 1.5 hours. The mixture was stirred at −78° C. for an additional two hours. Twenty ml. of methanol were then added with stirring. The propane was allowed to evaporate and the polymer was dissolved in 200 ml. of toluene. The polymer was precipitated in 1.3 liters of methanol containing 0.2 gram butylated hydroxy toluene. After chopping in a blender and washing with methanol, the polymer was dried at 50° C. and 25 inches of vacuum for four hours. The yield was 11.4 grams of colorless crisp polymer having an inherent viscosity of 0.73 (0.5 gram per 100 ml. toluene at 25° C.), a softening point of ca. 75° C., and a melting point of ca. 130° C. Film cast 20 mills wet from 30 percent solution to toluene was flexible and clear. The film retained its flexibility at −78° C.

EXAMPLES 3 to 7.—BORON TRIFLUORIDE POLYMERIZATION OF HIGHER VINYL 2,2-DIMETHYLALKYL ETHERS

Vinyl 2,2-dimethylhexyl, vinyl 2,2-dimethyloctyl, vinyl 2,2-dimethyldecyl, vinyl 2,2-dimethyldodecyl, and vinyl 2,2-dimethyltetradecyl ethers were each polymerized following the procedure given in Example 1. The polymers obtained are described in the following table.

Table 2

PROPERTIES OF SOME POLY(VINYL 2,2-DIMETHYLALKYL ETHERS)

| Example | Polymer of— | I.V.[1] | Description |
|---|---|---|---|
| 3 | Vinyl 2,2-dimethylhexyl ether | 0.44 | Rubbery solid. |
| 4 | Vinyl 2,2-dimethyloctyl ether | 0.42 | Rubbery glass. |
| 5 | Vinyl 2,2-dimethyldecyl ether | 0.36 | Soft glass, sticky. |
| 6 | Vinyl 2,2-dimethyldodecyl ether | 0.35 | Do. |
| 7 | Vinyl 2,2-dimethyltetradecyl ether. | 0.38 | Viscous sticky liquid. |

[1] 0.5 gram per 100 ml. toluene at 25° C.

These polymers had excellent adhesion to a variety of materials. Tack increased with molecular weight.

EXAMPLE 8.—POLYMERIZATION OF VINYL 2,2-DIMETHYLBUTYL ETHER WITH Et₂AlCl

Vinyl 2,2-dimethylbutyl ether was polymerized following the same general procedure given in Example 1 except the solvent was an equal volume mixture of toluene and liquid propylene and the catalyst was diethyl aluminum chloride. The resulting polymer was a colorless hard solid having an I.V. of 0.85 (0.5 gram per 100 ml. of toluene) and a melting point of ca. 185° C. Extrusion of the polymer gave fibers that were readily oriented by stretching. Films cast from toluene solution and oriented by drafting and tentering were clear, strong, and flexible.

EXAMPLE 9.—SHEAR STABILITY

The shear stability of the polymers prepared in Examples 5, 6, and 7 are compared to the shear stability of a polymer commonly used as a viscosity index improver. Comparable solutions were used, all having a viscosity of 1200 seconds Saybolt at 100° F. The solvent for each of the polymers was an oil having a viscosity of 850 seconds Saybolt at 100° F. The following table shows the change in viscosity of the polymer solutions after passing through a capillary having a diameter of 0.2 mm. and a length of 3 cm. under a pressure of about 1300 p.s.i.

Table 3

COMPARATIVE SHEAR STABILITY

| No. of Passes Thru Capillary | Isobutylene Copolymer | Polymer from Example— | | |
|---|---|---|---|---|
| | | 5 | 6 | 7 |
| | Sec. | Sec. | Sec. | Sec. |
| 0 | 1,200 | 1,200 | 1,200 | 1,200 |
| 15 | 1,005 | 1,180 | 1,173 | 1,186 |
| 30 | 930 | 1,130 | 1,125 | 1,140 |

The above data indicates that the vinyl 2,2-dimethylalkyl polymers have better shear stability than the isobutylene polymer. Isobutylene polymer is a commonly used viscosity index improver.

EXAMPLE 10.—VINYL CHLORIDE COPOLYMER

A vinyl chloride-vinyl 2,2-dimethylhexyl ether copolymer containing 85 percent vinyl chloride and 15 percent vinyl ether was prepared as follows: To a 400-ml. Parr shaker bottle was charged 7.5 grams inhibitor free vinyl 2,2-dimethyhexyl ether, 180-ml. distilled water, 2.0 grams Duponol ME, 3 drops dodecylmercaptan, 5 drops 25 percent trimethylamine in water, 0.16 gram sodium persulfate, and 0.20 gram sodium bisulfite. The bottle and contents were cooled to −10° C. and 42.5 grams freshly distilled vinyl chloride was added. Shook the stoppered bottle in a Parr shaker at 55° C. for 36 hours. Precipitated the emulsion with a saturated lithium chloride solution, filtered, washed with water, methanol and water. Added one percent of a 50/50 mixture of Ferro 900 and Stayflex OY. Dried in vacuum over at 50° C. for ten hours. Compression molded a sample button at 160° C. to obtain a clear flexible button. The material was strong, flexed without crazing and remained flexible at 0° C. Heat and light had little effect on the flexibility during a period of several months. The copolymer had a softening point of about 63° C. and an I.V. of 0.29 (0.5 gram per 100 ml. of DMF at 25° C.).

EXAMPLE 11.—VINYLIDENE CHLORIDE COPOLYMER

The same procedure described in Example 10 was used to prepare a 93/7 and an 85/15 vinylidene chloride/vinyl 2,2-dimethylhexyl ether copolymer. The copolymer was very flexible, strong, and tough. Excellent flexibility was retained at 0° C. It had a softening point of 130° C. (dec.) for the 93/7 copolymer and a softening point of 110° C. for the 85/15 copolymer. The polymers were only partially soluble in DMF or toluene at 25° C. but were soluble in hot xylene.

EXAMPLE 12.—ACRYLONITRILE COPOLYMER

A mixture containing 30 grams acrylonitrile, 20 grams vinyl 2,2-dimethylbutyl ether and 0.12 gram benzoyl peroxide was placed in strong sunlight for several hours and then heated at 55° until the polymerization was complete. The polymer was dissolved in dimethylformamide, precipitated with water, washed with methanol and dried. Films cast from a nitromethane solution were clear and flexible. Tensile strength of the film was 8,000 p.s.i. with an elongation of 300 percent. The material retained excellent flexibility at 0° C. The copolymer had a softening point of 82° C. The copolymer was only partially soluble in DMF of toluene at 25° C.

EXAMPLE 13.—METHYL METHACRYLATE COPOLYMER

A 95/5 methyl methacrylate/vinyl 2,2-dimethylhexyl ether copolymer was prepared by solution polymerization as follows: To a 1-liter, 3-necked flask equipped with stirrer, condenser, and source of dry nitrogen was charged 142.5 grams methyl methacrylate, 7.5 grams vinyl 2,2-dimethylhexyl ether, 350 grams toluene, and 0.75 gram benzoyl peroxide. The mixture was heated with stirring under nitrogen at 80° C. for 24 hours. Films cast from the solution were strong and had excellent flexibility. A copolymer made as above but using vinyl 2,2-dimethyloctyl ether had slightly better flexibility and had better adhesion. Both films retained excellent flexibility at 0° C. These copolymers had softening points of 104° C. (I.V. of 0.23, 0.5 gram per 100 ml. of toluene) for the methyl methacrylate/vinyl 2,2-dimethylhexyl ether copolymer and 98° C. (I.V. of 0.26, 0.5 gram per 100 ml. of toluene) for the methyl methacrylate/vinyl 2,2-dimethyloctyl ether copolymer.

EXAMPLE 14.—METHYL METHACRYLATE COPOLYMER

A 95/5 methyl methacrylate/vinyl 2,2-dimethylbutyl ether copolymer was prepared as in Example 13. The copolymer had a softening point of 120° C. and an I.V. of 0.23 (0.5 gram per 100 ml. of toluene at 25° C.). A film cast from the copolymer was smooth and hard and had excellent flexibility.

EXAMPLE 15.—ACRYLONITRILE COPOLYMER

A 63/37 acrylonitrile/vinyl 2,2-dimethyloctyl ether copolymer was prepared as in Example 12 from a monomer mixture of 60 grams of acrylonitrile and 20 grams of vinyl 2,2-dimethyloctyl ether. The softening point of the copolymer was 85° C. The I.V. was 2.8 (0.5 gram per 100 ml. of DMF at 25° C.).

While the resinous copolymers of the invention has been illustrated in the above examples with just certain of the preferred comonomers and certain proportions of such components, it will be understood that other monoethylenically unsaturated, polymerizable monomers also give useful copolymers when substituted in the above-described polymerization processes. For example, vinyl and isopropenyl carboxylic acid esters such as vinyl acetate, vinyl propionate, vinyl trifluoroacetate, isopropenyl acetate, vinyl benzoate, etc., styrene, α-methylstyrene, vinyl fluoride, allyl acetate, methallyl acetate, vinyl ethers, vinyl ketones, vinyl sulfonamides, vinyl urethanes, vinyl pyrrolidones, vinyl pyridines, and the like, give useful resinous copolymers when copolymerized with any of the vinyl 2,2-dimethylalkyl ethers of the invention. The polymers are all soluble in one or more common volatile solvents to form solutions or dopes which can be extruded to filaments, coated to continuous films or sheets or applied as impregnating agents to paper and textiles and other fibrous materials or as adhesives to various surfaces. Some are especially useful for molding shaped articles. Those copolymers containing major proportions by weight of acrylonitrile are soluble in solvents such as dimethylformamide, dimethylacetamide, α-butyrolactone, and the like, and being particularly adapted for fiber-making purposes. The polymeric compositions can also be modified, if desired, by the incorporation of various fillers, coloring matter, plasticizers, etc.

The invention has been described in detail with particular reference to preferred embodiments thereof, but it will be understood that variations and modifications can be effected within the spirit and scope of the invention as hereinabove and as defined in the appended claims.

What we claim is:

1. A homopolymer of a vinyl 2,2-dimethylalkyl ether represented by the structural formula:

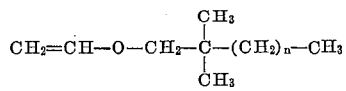

wherein $n$ stands for a whole number from 1 to 14 prepared by the process of reacting said vinyl 2,2-dimethylalkyl ethers in the presence of a catalyst selected from the group consisting of free radical, Ziegler and cationic catalysts, wherein said reaction is maintained within the temperature range of $-80°$ C. to $100°$ C. and wherein said catalyst concentration is maintained within the range of 0.1 to 3 percent based on the weight of the monomer to be polymerized.

2. The homopolymer of vinyl 2,2-dimethylbutyl ether prepared by the process of reacting said vinyl 2,2-dimethyl alkyl ethers in the presence of a catalyst selected from the group consisting of free radical, Ziegler and cationic catalysts, wherein said reaction is maintained within the temperature range of $-80°$ C. to $100°$ C. and wherein the catalyst concentration is maintained within the range of 0.1 to 3 percent based on the weight of the monomer to be polymerized.

3. A copolymer of a vinyl 2,2-dimethylalkyl ether represented by the structural formula

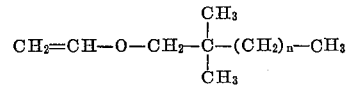

wherein $n$ stands for a whole number from 1 to 14, and a vinyl comonomer selected from the group consisting of vinyl chloride, vinylidene chloride, acrylonitrile and methyl methacrylate prepared by the process of reacting said vinyl 2,2-dimethylalkyl ethers and said vinyl comonomer in the presence of a catalyst selected from the group consisting of free radical, Ziegler, and cationic catalysts, wherein said reaction is maintained within the temperature range of $-80°$ C. to $100°$ C. and wherein said catalyst concentration is maintained within the range of 0.1 to 3 percent based on the weight of the monomers to be polymerized.

4. A copolymer of from 5 to 95 percent by weight of vinyl 2,2-dimethylhexyl ether and from 95 to 5 percent by weight of vinyl chloride prepared by the process of reacting said vinyl 2,2-dimethylhexyl ether and vinyl chloride in the presence of a catalyst selected from the group consisting of free radical, Ziegler, and cationic catalysts, wherein said reaction is maintained within the temperature range of $-80°$ C. to $100°$ C. and wherein said catalyst concentration is maintained within the range of 0.1 to 3 percent based on the weight of the monomers to be polymerized.

5. A copolymer of from 5 to 95 percent by weight of vinyl 2,2-dimethylhexyl ether and from 95 to 5 percent by weight of vinylidene chloride prepared by the process of reacting said vinyl 2,2-dimethylhexyl ether and vinylidene chloride in the presence of a catalyst selected from the group consisting of free radical, Ziegler, and cationic catalysts, wherein said reaction is maintained within the temperature range of $-80°$ C. to $100°$ C. and wherein said catalyst concentration is maintained within the range of 0.1 to 3 percent based on the weight of the monomers to be polymerized.

6. A copolymer of from 5 to 95 percent by weight of vinyl 2,2-dimethylbutyl ether and from 95 to 5 percent by weight of acrylonitrile prepared by the process of reacting said vinyl 2,2-dimethylbutyl ether and acrylonitrile in the presence of a catalyst selected from the group consisting of free radical, Ziegler, and cationic catalysts, wherein said reaction is maintained within the temperature range of $-80°$ C. to $100°$ C. and wherein said catalyst concentration is maintained with the range of 0.1 to 3 percent based on the weight of the monomers to be polymerized.

7. A copolymer of from 5 to 95 percent by weight of vinyl 2,2-dimethylbutyl ether and 95 to 5 percent by weight of methyl methacrylate prepared by the process of reacting vinyl 2,2-dimethylbutyl ether and methyl methacrylate in the presence of a catalyst selected from the group consisting of free radical, Ziegler, and cationic catalysts, where said reaction is maintained within the temperature range of $-80°$ C. to $100°$ C. and wherein said catalyst concentration is maintained within the range of 0.1 to 3 percent based on the weight of the monomers to be polymerized.

References Cited by the Examiner

UNITED STATES PATENTS 2,717,248   9/1955   Vaughan et al. _____ 260—63

OTHER REFERENCES

Gast et al.: J. Am. Oil Chemists' Soc., vol. 37, February 1960, pp. 78–80.

JOSEPH L. SCHOFER, *Primary Examiner.*

H. WONG, *Assistant Examiner.*